Figure 1:
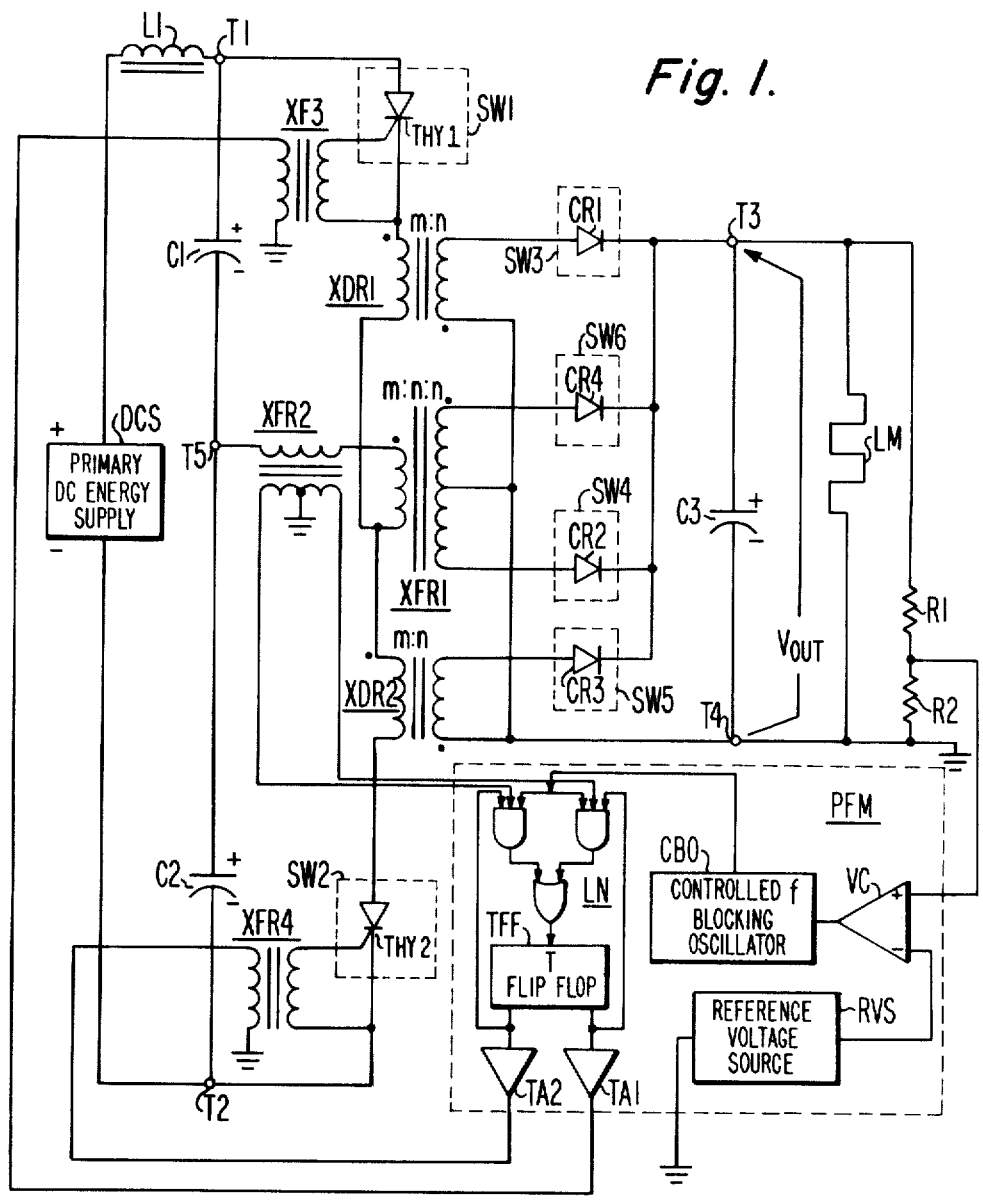

United States Patent [19]
Pruitt

[11] 4,369,489
[45] Jan. 18, 1983

[54] SWITCHING DC-TO-DC CONVERTER SUPPLYING UNINTERRUPTED OUTPUT CURRENT

[75] Inventor: Duard L. Pruitt, Cinnaminson, N.J.
[73] Assignee: RCA Corporation, New York, N.Y.
[21] Appl. No.: 223,494
[22] Filed: Jan. 8, 1981
[51] Int. Cl.[3] .............................................. H02M 3/315
[52] U.S. Cl. .......................................... 363/28; 363/96
[58] Field of Search ....................................... 363/27–18, 363/96, 126, 135–139, 59–61, 67–70

[56] References Cited

U.S. PATENT DOCUMENTS

| | | | |
|---|---|---|---|
| 3,412,310 | 11/1968 | Quinn | 363/61 |
| 3,663,940 | 5/1970 | Schwarz | 363/28 |
| 3,740,639 | 6/1973 | Easter | 363/21 |
| 3,781,637 | 12/1973 | Potter | 363/27 |
| 3,846,694 | 11/1974 | Archer | 363/96 |
| 4,055,791 | 10/1977 | Bland et al. | 363/28 |

FOREIGN PATENT DOCUMENTS 650-178  2/1979  U.S.S.R. ............................ 363/61

OTHER PUBLICATIONS

Hirofumi Matsuo, "Comparison of Multiple Output DC–DC Converters Using Cross Regulation", Power Conversion International, Nov./Dec., 1980, pp. 14–37.

*Primary Examiner*—William M. Shoop
*Assistant Examiner*—Peter S. Wong
*Attorney, Agent, or Firm*—Samuel Cohen; Robert L. Troike; Allen LeRoy Limberg

[57] ABSTRACT

A push-pull switching dc-to-dc converter using controlled rectifiers as switch elements delivers uninterrupted output current to its load, owing to the inclusion of plural-winding inductors.

9 Claims, 4 Drawing Figures

SWITCHING DC-TO-DC CONVERTER SUPPLYING UNINTERRUPTED OUTPUT CURRENT

The present invention relates to switching dc-to-dc converters using semiconductor controlled rectifiers (SCR's) or other types of thyristor as switching elements and, more particularly, to switching dc-to-dc converters that provide a substantially uninterrupted flow of output current to a smoothing capacitor and load.

In a switching dc-to-dc converter embodying the invention, first and second terminals for connecting a primary energy supply therebetween have first and second capacitors in series connection between them, one of which will be fully discharged during each half cycle of the switching dc-to-dc conversion while the other is charged from the primary energy supply. A transformer has a primary winding with a first end at the node between the first and second capacitors. The second end of its primary winding is selectively connected to the first terminal through the primary winding of a first plural-winding inductor by the anode-to-cathode conduction of a first controlled rectifier, and is selectively connected at other times to the second terminal through the primary winding of a second plural-winding inductor by the anode-to-cathode conduction of a second controlled rectifier. A pulse frequency modulator applies triggering pulses alternately between the cathode and gate electrode of these first and second controlled rectifiers at a rate depending upon the output voltage of the converter as developed across paralleled capacitive means and converter load. This output voltage is developed responsive to the rectified current flows of current through the secondary windings of the transformer and of the first and second plural-winding inductors. Substantially uninterrupted output current flow is provided. During each interval when neither of the first and second controlled rectifiers is conductive, the output current is provided by collapse of the field surrounding the windings of both of the plural-winding inductors. During each interval when one of the first and second controlled rectifiers is conductive, the transformer transforms the current flowing through its primary winding and that of the plural-winding inductor in which the field surrounding its windings is being rebuilt, to provide a component of output current by normal transformer action. At the same time a further component of output current is supplied by the other plural-winding inductor as the field surrounding its windings continues to collapse.

In the drawing:

FIGS. 1–4 are schematic diagrams of switching dc-to-dc converters, each of which is an embodiment of the invention.

In the FIG. 1 switching dc-to-dc converter, a primary dc energy supply DCS is applied between input terminals T1 and T2 through a choke coil L1 in such poling that T1 and T2 are at relatively positive and relatively negative potentials, respectively. The converter output terminals T3 and T4 have a load means LM connected between them, and T4 is shown as being grounded. The positive plate of a capacitor C1 connects to terminal T1, and its negative plate connects to a terminal T5 to which the positive plate of a capacitor C2 also connects. The negative plate of C2 connects to terminal T2. These capacitors should be a-c rated.

C1 is recurrently discharged and C2 recurrently charged by first switch means SW1 conducting to connect the primary windings of a first plural-winding inductor XDR1, a conventional transformer XFR1, and a current transformer XFR2 between terminals T1 and T5. The plural-winding inductor or flyback transformer has a magnetic structure which permits the storage of energy in a field surrounding its windings responsive to the passage of direct current through one of its windings, which magnetic structure conventionally includes an air gap; a conventional transformer on the other hand has a magnetic structure without air gap, is suited for the transformation of alternating currents, and should be operated without appreciable direct current through its winding lest its magnetic core saturate to interfere with alternating current transformation on peaks. The current transformer XFR2 has substantially no voltage drop across a few-turn primary and is used to derive voltages across its center-tapped secondary which can be used as input signals to circuitry that guarantees that switches SW1 and SW2 are alternately and not simultaneously conductive.

Switch means SW1 can be provided, as shown, by the anode-to-cathode conduction path of a semiconductor controlled rectifier (SCR), or thyristor, THY1. Such a device once triggered into conduction by a trigger signal applied between its cathode and gate electrode continues to conduct current so long as it be available, signals applied to its gate electrode subsequent to its being triggered into conduction not affecting its conduction until the lack of current for its anode-to-cathode path to conduct interrupts its conduction. So capacitor C1 discharges to zero volts thereacross, while capacitor C2 is charged so that the voltage at terminal T5 to which one of its plates connects can be equal to that at terminal T1. Since the other plate of C2 connects to terminal T2, it will be charged to a voltage equal to that between terminals T1 and T2—that is, the voltage of the primary dc energy supply DCS.

Some time after switch means SW1 has become non-conductive, which time is controlled to affect voltage regulation of the converted dc, as will be explained later in this specification, C1 will be recharged and C2 will be discharged by second switch means SW2 conducting to connect the primary windings of plural-winding inductors XFR2 and XFR1 and of a second transductor XDR2 between terminals T5 and T2. Switch means SW2 can be provided, as shown, by the anode-to-cathode conduction path of an SCR, or thyristor, THY2. So the discharge of C2 will continue until there is zero voltage across it, and C1 will be charged to have across it the voltage of the primary dc energy supply DCS. Some time thereafter, as determined in accordance with the voltage regulation of the converted dc switch means SW1 will again be rendered conductive and the cycle described above will repeat. C1 and C2 preferably are of equal capacitances so that alternate half cycles of the conversion process are symmetrically performed. Since there is no path for dc flow through the primary winding of transformer XFR1 there can be no undesirable dc magnetic saturation which would adversely affect its current and voltage transforming properties.

During the conduction of switch means SW1, the current flowing to charge C2 flows through the primary windings of XDR1 and XFR1, to store energy in the field surrounding the windings of plural-winding inductor XDR1 since switch means SW3 is non-conductive, and to transform that current in XFR1 to be applied via conductive switch means SW4 and terminals T3 and T4 to load means LM. LM is shown paralleled by a smoothing capacitor C3 which need not be a-c rated and can be an electrolytic. Switch means SW3 may simply consist of a current rectifier CR1 poled to be non-conductive responsive to the polarity of voltage induced across the secondary winding of XDR1 during discharging of C1 and charging of C2; and the order in which CR1 and the secondary winding of XDR1 are connected between T3 and T4 may, of course, be reversed from that shown. Switch means SW4 may simply consist of a current rectifier CR2 poled for forward conduction of the desired polarity of transformed current from one of the secondary windings of XFR1; the order of connection of that winding and CR2 between terminals T3 and T4 may be reversed, in which case separate leads for the transformer secondaries must be brought out from the transformer XFR1.

During the conduction of switch means SW2, the current flowing to charge C1 flows through the primary windings of XDR2 and XFR1, to store energy in the field surrounding the windings of XDR2 since switch means SW5 is non-conductive, and to transform that current in XFR1 to be applied via conductive switch means SW6 and terminals T3 and T4 to load means LM. Switch means SW5 and SW6 can simply consist of current rectifiers CR3 and CR4, respectively, and the order either is in in series connection with a transformer winding may, of course, be reversed from that shown. (While switch means SW3, SW4, SW5 and SW6 are most simply realized using current rectifier diodes three terminal devices could be used instead— e.g., to avoid the voltage offsets that occur across such diodes.) The ratio of the turns of the primary winding of transformer XFR1 to the turns of its secondary windings is m:n:n, where m and n are each any positive integer, so the current supplied to load means LM when C1 is charged and C2 discharged is substantially the same as that supplied when C2 is charged and C1 discharged. This is in line with standard dc-to-dc converter design procedures.

The bulk of the dc-to-dc conversion can be provided by conventional current transformation through transformer XFR1 in the invention, reducing the weight and bulk of the converter as compared to a flyback dc-to-dc converter relying solely on energy storage in and subsequent release from inductors for conversion. But the dc-to-dc converter of the invention differs from conventional converters using transformers driven push-pull at their primary windings in that a portion of the conversion process is carried out using energy storage in and subsequent release from inductors, so that an uninterrupted flow of output current can be obtained from the converter.

During each interval switch means SW1 is non-conductive the cessation of current flow through switch means SW1 and the primaries of XDR1, XFR1 and XFR2 has two effects. The interruption of current flow through transformer XFR1 primary winding interrupts current flow through either of its secondary windings. The interruption of current flow through the primary winding of plural-winding inductor XDR1 allows the field built up surrounding its windings to collapse. In accordance with Lenz's Law the voltage induced across the secondary winding of XDR1 reverses polarity responsive to the waning rather than waxing of magnetic field strength, and switch means SW3 is made conductive to connect this winding between terminals T3 and T4 to supply current to load means LM. Where switch means SW3 is a current rectifier CR1, its conduction is responsive to the reversal of the polarity of the voltage induced across the secondary winding. The same current flowed through the primary windings of XFR1 and XDR1 while switch means SW1 was conductive; by making the ratio of the turns of the primary winding of plural-winding inductor XDR1 to the turns of its secondary winding to be the same m:n ratio as the ratio of the turns of the primary winding of transformer XFR1 to each of its secondary windings, the plural-winding inductor flyback current from the secondary winding of transductor XDR1 will be m/n times as large as its primary current was when interrupted by cessation of conduction by switch means SW1. So current is supplied from the secondary winding of plural-winding inductor XDR1 responsive to the collapse of the field surrounding it to flow through switch means SW3 to load means LM, which current is substantially the same value as that just previously flowing to load means LM via switch means SW4 from a secondary winding of transformer XFR1.

Similarly, plural-winding inductor XDR2 supplies current from its secondary winding through a conductive switch means SW5 during each interval switch means SW2 is non-conductive. There is no appreciable interval of time, then, in which load means LM does not receive converted dc.

The commutation of triggering pulses to the controlled rectifiers THY1 and THY2, and the attendant switching regulation of the output voltage across load means LM is carried out using a pulse frequency modulator PFM. Pulse frequency modulator PFM supplies triggering pulses alternately to controlled rectifiers THY1 and THY2 at a pulse repetition rate that respectively increases and decreases as the output voltage $V_{OUT}$ between terminals T4 and T3 tends to fall below or to rise above a prescribed value. To this end, $V_{OUT}$ is divided down in a resistive potential divider comprising resistors R1 and R2 with respective resistances $R_1$ and $R_2$. The divided-down voltage $V_{OUT} R_2/(R_1+R_2)$ is compared against a reference voltage from reference voltage source RVS in a voltage comparator VC to develop an error signal for controlling the frequency of oscillations from a frequency controlled blocking oscillator CBO. Transitions in level of alternate pulses from the output oscillations of CBO trigger a triggerable flip-flop TFF from one state to another unless inhibited by a logic network LN. Logic network LN responds to control voltages from the split-phase secondary winding of current-sensing transformer XFR2 to prevent triggering of either controlled rectifier THY1 and THY2 while the other is conductive; and some wave-shaping circuitry (not shown) may in actuality be used between XFR2 and logic network LN. Transitions in level of the complementary outputs of the flip-flop TFF are shaped and amplified by trigger amplifiers TA1 and TA2 to supply trigger pulses for application to controlled rectifiers THY1 and THY2, respectively. Coupling transformers XFR3 and XFR4 are arranged in FIG. 1 to apply these triggering pulses with appropriate dc level shifting, although other coupling arrangements can be made when the input terminals $T_1$ and $T_2$ and the output terminals T3 and T4 are referred to a common potential.

Figure 2:
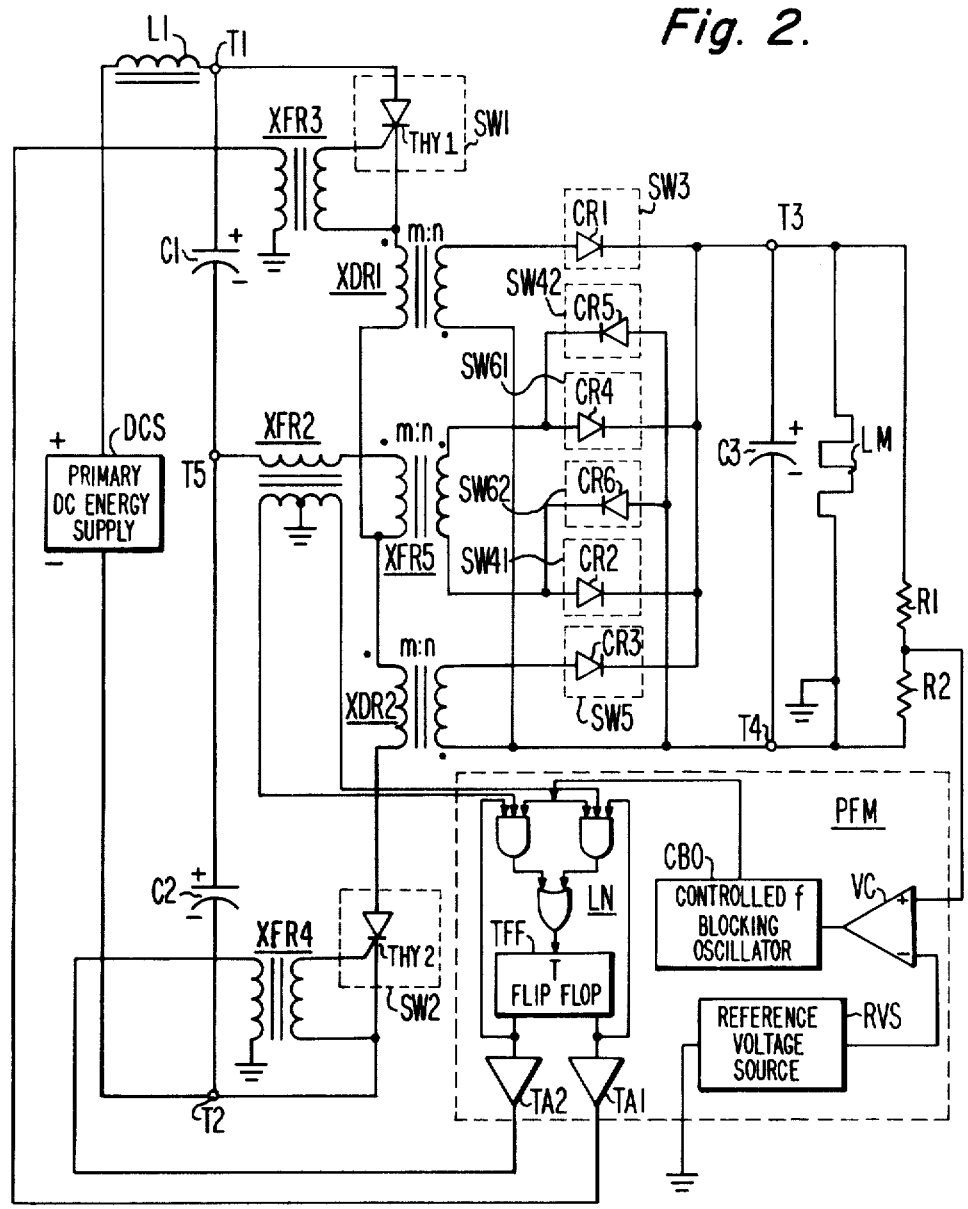

FIG. 2 shows a modification that can be made to the FIG. 1 circuit to permit the use of a transformer XFR5 without center-tapped secondary winding instead of transformer XFR1. Switch means SW4 is replaced by two switch means SW41 and SW42 which may simply consist of current rectifier CR2 and another current rectifier CR5, respectively; and switch means SW6 is replaced by two switch means SW61 and SW62 which may simply consist of current rectifier CR4 and another current rectifier CR6, respectively.

Figure 3:
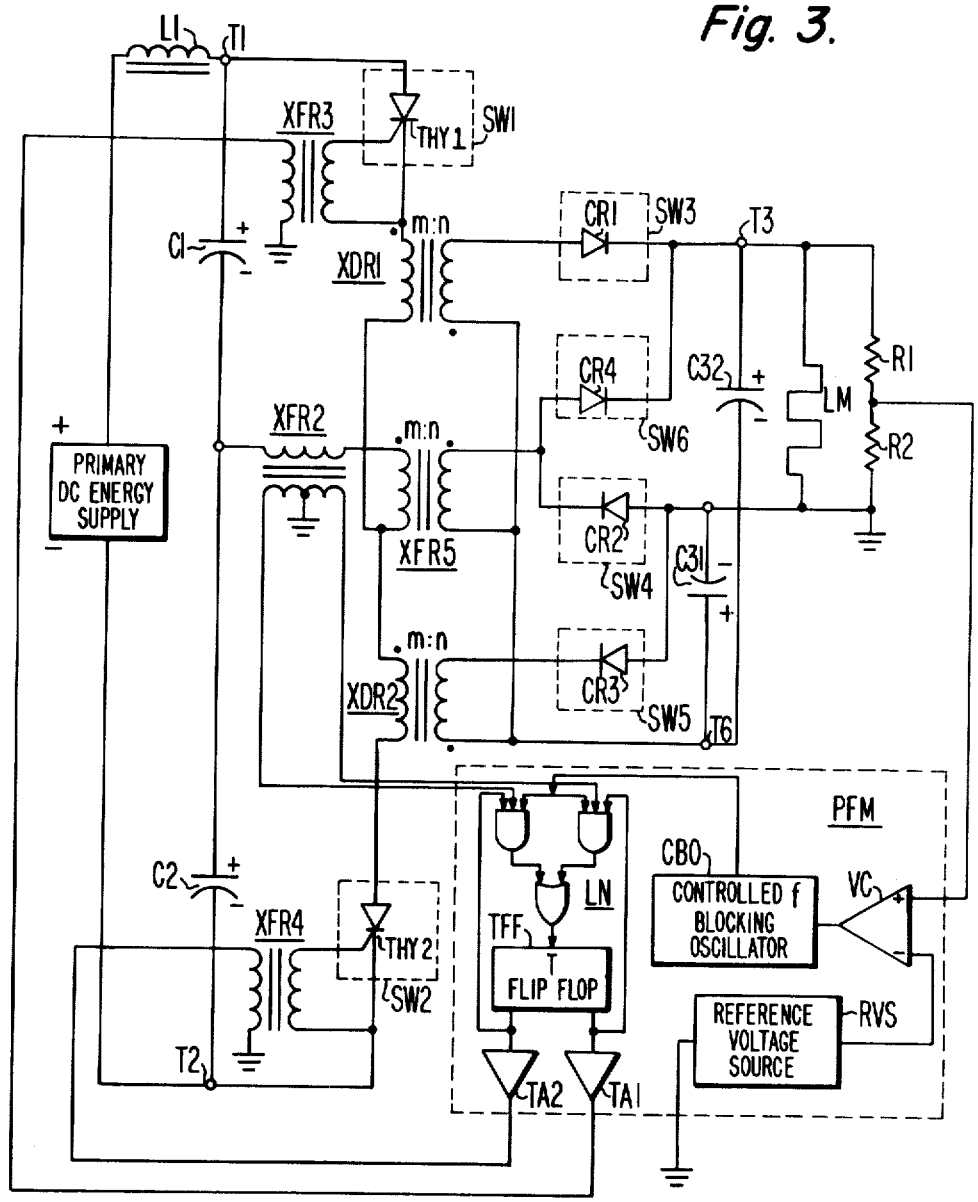
Figure 4:
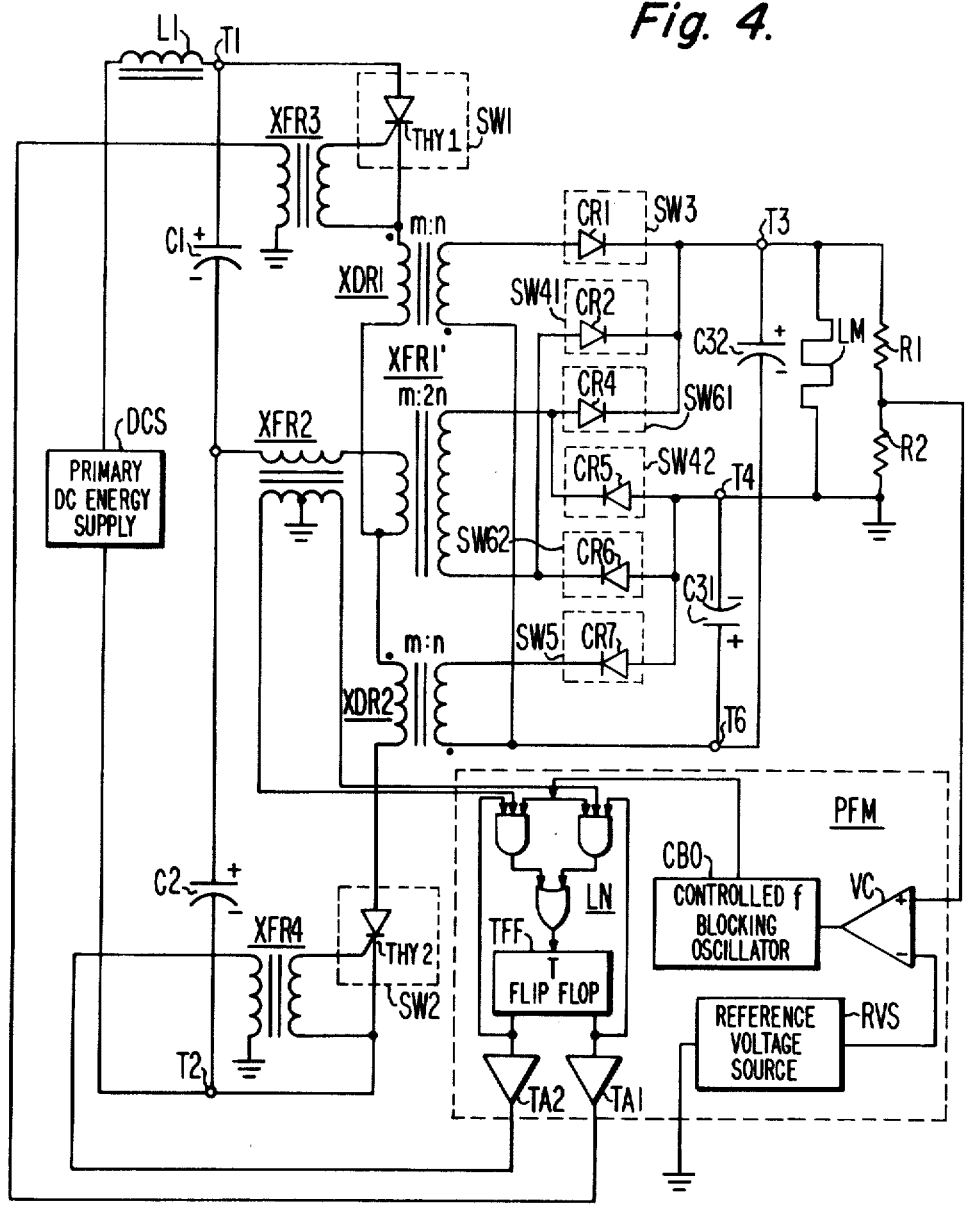

Voltage-doubling output configurations are possible by reconfiguring the switch means in the output circuit and replacing smoothing capacitor C3 with two serially connected smoothing capacitors C31 and C32, which maintain the potential at terminl T6 at which they interconnect at a potential intermediate to those at terminals T3 and T4. Voltage-doubling in the output circuit is desirable for supplies with relatively high output voltages, inasmuch as it reduces the peak inverse voltage requirement on each of the current rectifiers CR1 and CR3, which is as high as five times output voltage in the configurations of FIGS. 1 and 2. FIGS. 3 and 4 illustrate the dc-to-dc converters with voltage-doubling output circuits. In these circuits plural-winding inductor XDR1 supplies current to load means LM for the entire durations of intervals switch means SW1 is non-conductive, and plural-winding inductor XDR2 supplies current to load means for the entire durations of the intervals switch means SW2 is non-conductive.

Where output voltages balanced against ground are required of a switching dc-to-dc converter, the converters of FIGS. 3 and 4 may be adapted for this purpose by reconnecting ground to terminal T6 and taking positive and negative output voltages respective to ground from terminals T3 and T4.

What is claimed is:

1. A switching dc-to-dc converter for supplying substantially continuous converted dc without having to have output filtering comprising:
   first and second terminals for connection therebetween of a primary dc energy supply;
   third and fourth terminals for connection therebetween of a load receptive of the converted dc;
   a fifth terminal;
   first and second capacitors connected between said fifth terminal and respective ones of said first and second terminals;
   first and second plural-winding inductors, non-saturable in operation, each having a respective primary winding and a respective secondary winding with a turns ratio of m:n between them, and each having sufficient inductance to sustain substantially direct current flow through its secondary winding during flyback intervals in the conversion process;
   a transformer having a primary winding with a first end and a second end and having at least a first secondary winding with a turns ratio between it and the primary winding of such value that there is no substantial discontinuity in the converted dc;
   means for connecting the first end of the primary winding of said transformer to said fifth terminal;
   a first controlled rectifier, having cathode and anode for defining the ends of a principal conduction path connected in series with a primary winding of said first plural-winding inductor between said first terminal and the second end of the primary winding of said transformer, and having a gate electrode, the conduction intervals of said first controlled rectifier being interspersed with the flyback intervals of said first inductor;
   a second controlled rectifier, having cathode and anode for defining the ends of a principal conduction path connected in series with the primary winding of said second plural-winding inductor between said second terminal and the second end of the primary winding of said transformer, and having a gate electrode, the conduction intervals of said second controlled rectifier being interspersed with the flyback intervals of said second inductor;
   means for rectifying the flows of current through the secondary windings of said first and second plural-winding inductors and each said secondary winding of said transformer and
   means for applying these rectified flows of current in similar polarity between said third and fourth terminals; and
   a pulse frequency modulator for applying triggering pulses alternately between the cathode and gate electrode of said first controlled rectifier and between the cathode and gate electrode of said second controlled rectifier, at a rate responsive to the amplitude of the voltage between said third and fourth terminals.

2. A switching dc-to-dc converter as set forth in claim 1 wherein:
   a first current rectifier is in series connection with the secondary winding of said first plural-winding inductor between said third and fourth terminals; and
   a second current rectifier is in series connection with the secondary winding of said second plural-winding inductor between said third and fourth terminals.

3. A switching dc-to-dc converter as set forth in claim 2 wherein:
   said transformer has a second, as well as a first, secondary winding and has an m:n turns ratio between its primary winding and each of its secondary windings;
   a third current rectifier is in series connection with said first secondary winding of said transformer between said third and fourth terminals; and
   a fourth current rectifier is in series connection between said third and fourth terminals with said second secondary winding of said transformer.

4. A switching dc-to-dc converter as set forth in claim 2 wherein:
   said transformer has an m:n ratio between its primary winding and first secondary winding;
   third and fourth current rectifiers have anode and cathode connections to said third terminal and to said fourth terminal, respectively, and have cathode and anode connections to one end of said first secondary winding of said transformer, respectively; and
   fifth and sixth current rectifiers have cathode and anode connections to the other end of said first secondary winding of said transformer, respectively, and have anode and cathode connections to said third terminal and to said fourth terminal, respectively.

5. A switching dc-to-dc converter as set forth in claim 2, 3 or 4, wherein:
   a third capacitor is connected between said third and fourth terminals.

6. A switching dc-to-dc converter as set forth in claim 1 including:
   a sixth terminal;

means for maintaining said sixth terminal at a potential between those at said third and fourth terminals;

a first current rectifier in series connection with the first secondary winding of said first plural-winding inductor between said third and sixth terminals; and a second current rectifier in series connection with the first secondary winding of said second plural-winding inductor between said fourth and sixth terminals.

7. A switching dc-to-dc converter as set forth in claim 6, wherein:

said transformer primary winding and first secondary winding are in m:2n turns ratio;

third and fourth current rectifiers have anode and cathode connections to said third terminal and to said fourth terminal, respectively, and have cathode and anode connections respectively to one end of the first secondary winding of said transformer; and a connection exists between the other end of the secondary winding of said transformer and said sixth terminal.

8. A switching dc-to-dc converter as set forth in claim 6 wherein:

said transformer primary winding and first secondary winding are in m:n turns ratio;

third and fourth current rectifiers having anode and cathode connections to said third terminal and to said fourth terminal, respectively, and have cathode and anode connections respectively to one end of the first secondary winding of said transformer; and fifth and sixth current rectifiers have cathode and anode connections respectively to the other end of the first secondary winding of said transformer, and have anode and cathode connections to said third terminal and to said fourth terminal, respectively.

9. A switching dc-to-dc converter as set forth in claim 6, 7 or 8, wherein said means for maintaining said sixth terminal at a potential between those at said third and fourth terminals comprises:

a third capacitor connected between said third and sixth terminals; and a fourth capacitor connected between said fourth and sixth terminals.

* * * * *